United States Patent

Mattas

[15] 3,647,989

[45] Mar. 7, 1972

[54] CONTROL CIRCUIT FOR A BIDIRECTIONAL RECORDER

[72] Inventor: Charles B. Mattas, Chicago, Ill.

[73] Assignee: Ampex Corporation, Redwood City, Calif.

[22] Filed: Nov. 10, 1969

[21] Appl. No.: 875,209

[52] U.S. Cl. ............... 179/100.2MD, 179/100.2 Z, 242/190, 242/191, 274/4 D

[51] Int. Cl. .................................... G11b 15/12, G11b 15/44

[58] Field of Search ......................... 179/100.2 MD, 100.2 Z; 242/190, 191; 274/4 D, 11 D

[56] References Cited

UNITED STATES PATENTS

| | | | |
|---|---|---|---|
| 2,468,198 | 4/1949 | Heller | 179/100.2 MD |
| 3,488,017 | 1/1970 | Schatteman | 242/191 |

*Primary Examiner*—Bernard Konick
*Assistant Examiner*—J. Russell Goudeau
*Attorney*—Luedeka, Fitch, Even and Tabin and Robert G. Clay

[57] ABSTRACT

The control circuit includes means for sensing the motion of a tape in a bidirectional recorder. When the tape motion decreases below a predetermined minimum, the motion sensing means causes two switching circuits to change states, the first of which activates a solenoid which reverses tape motion or begins the ejection cycle, depending on the recorder operating mode. The second switching circuit deactivates a recording bias circuit and an audio circuit of the tape recorder. The first switching circuit is provided with a delay with respect to the second switching circuit so as to delay the activation of the solenoid until the bias circuit and the audio circuit are deactivated, thereby preventing magnetization of a record head or heads and muting the audio.

5 Claims, 1 Drawing Figure

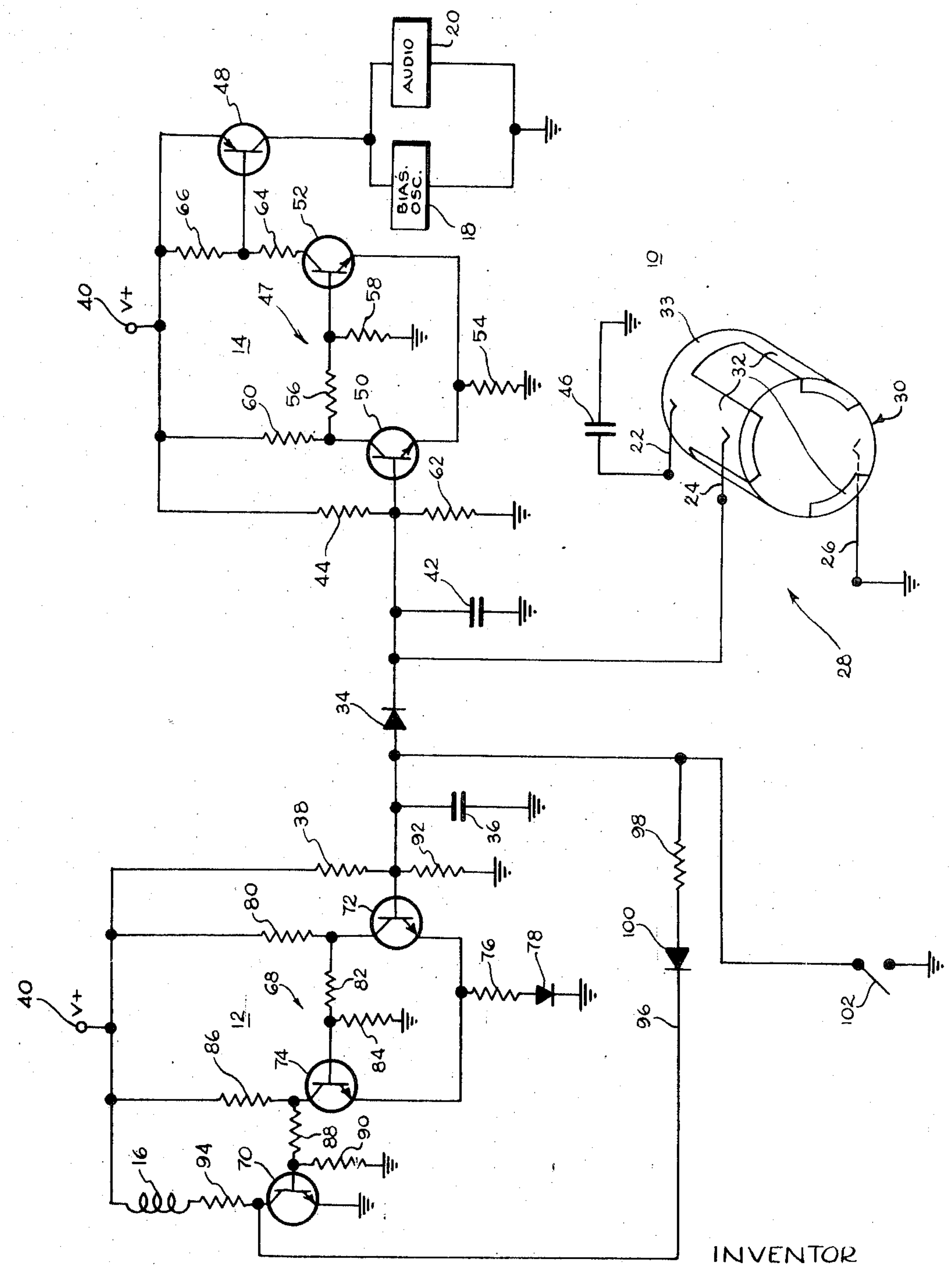
INVENTOR
CHARLES B. MATTIAS
Anderson, Luedeka, Fitch, Even & Tabin
ATTYS.

CONTROL CIRCUIT FOR A BIDIRECTIONAL RECORDER

The present invention relates to a control system for a bidirectional tape recorder and more particularly to a control system in such a recorder for deactivating recording bias and/or audio circuit prior to switching heads.

Normally, in bidirectional recorders, the direction of tape motion is reversed by energizing a solenoid which actuates the reversing mechanism as well as switches heads. It has been found that during this reversal, the deactivated recording head or heads becomes magnetized, if the deactivation of the head occurs when the recording bias voltage is not at zero potential. To prevent this magnetization, means should be provided in the recorder to deactivate the recording bias prior to the switching of the head.

Also, the switching of motors occurring during the reversal of tape motion causes audible transients which may be annoying to the listener. Accordingly, means should be provided in the recorder to deactivate the audio circuit prior to reversal.

It is an object of the present invention to provide in a bidirectional recorder a control system for deactivating the bias and/or audio prior to operation of a solenoid which reverses the direction of tape motion.

Other objects and advantages of the present invention will become apparent by reference to the following description and accompanying drawing in which the single FIGURE is a schematic circuit diagram of the control system built in accordance with the present invention.

Generally, the illustrated control circuit includes means 10 for sensing the motion of a tape (not shown) in a bidirectional recorder (not shown). When the tape motion decreases below a predetermined minimum, the motion sensing means 10 causes two switching circuits 12 and 14 to change states, the first 12 of which activates a solenoid 16 which reverses tape motion. The second switching circuit 14 deactivates a recording bias circuit 18 and an audio circuit 20 of the tape recorder. The first switching circuit 12 is provided with a delay with respect to the second switching circuit 14 so as to delay the activation of the solenoid 16 until the bias circuit 18 and the audio circuit 20 are deactivated, thereby preventing magnetization of a record head or heads (not shown) and muting the audio.

More particularly, as shown in the drawing, the motion sensing means 10 includes three sliding contacts 22, 24, and 26 making up a single-pole, double-throw switch 28 which are mounted in the recorder so as to be switched by a rotating cylinder 30 of nonconductive material having disposed in its surface three circumferentially spaced conducting segments 32. The conducting segments 32 are connected at one end to a circumferential conductive band 33. The cylinder 30 is attached to a spindle of one reel (not shown) of the tape recorder. One contact 22 (hereinafter referred to as the common contact) is disposed to continually contact the band 33, and the other contacts 24 and 26 (hereinafter referred to as first and second contacts) are disposed around the cylinder 30 so as to be alternately connected to the common contact 22 by the segments 32 but without the first and second contacts being shorted together. The second contact 26 of the double-throw switch 28 is grounded and the first contact 24 is connected through a steering diode 34 to one side of a first charge storing capacitor 36, the other side of which is grounded. The first charge storing capacitor 36 is charged through a first series resistor 38 connected to the positive terminal 40 of a power supply (not shown).

The first contact 24 of the switch 28 is also connected to one side of a second charge storing capacitor 42, the other side of which is grounded. The voltage for charging the second charge storing capacitor 42 is provided through a series resistor 44 from the positive terminal 40.

As can be seen from the drawing, each time the common contact 22 of the switch 28 is connected to the first contact 24 the first and second charge storing capacitors 36 and 42 are discharged into a discharge capacitor 46 connected between the common contact 22 and ground. This discharge capacitor 46 is discharged each time the common contact 22 is connected to the second contact 26. Thus, the storing capacitors 36 and 42 are periodically discharged as long as the cylinder 30 rotates, and the voltages developed across the storing capacitors do not reach predetermined levels, hereinafter referred to as switching levels, as long as the segmented cylinder 30 is rotating. However, if the rotation stops, the voltages appearing across the storing capacitors 36 and 42 will reach the switching levels.

The second switching circuit 14 which is employed in the illustrated embodiment to deactivate oscillator circuit 18 and the audio circuit 20 is a Schmitt trigger circuit 47 having its output connected to the base of a PNP-switching transistor 48. The emitter-collector circuit of the switching transistor 48 is connected in series with the parallel combination of the audio circuit 20, the bias oscillator circuit 18 and the power supply. The Schmitt trigger circuit 47 includes a pair of NPN-transistors 50 and 52 having their emitters connected through a common emitter bias resistor 54 to ground. The collector of the first transistor 50 is connected through a series resistor 56 to the base of the second transistor 52 which base is connected to ground through a base biasing resistor 58. The collector of the first transistor 50 is connected to the positive terminal 40 through a collector bias resistor 60. The base of the first transistor 50 is biased by connecting the same to the junction of two series resistors 44 and 62 connected between the positive terminal 40 and ground. The collector of the second transistor is connected to the positive terminal 40 through a pair of series resistors 64 and 66, the junction of which is connected to the base of the switching transistor 48.

In operation, as long as the voltage across the storing capacitor 42 is insufficient to switch the Schmitt trigger circuit 47, the first transistor 50 is biased to nonconduction and the second transistor 52 is biased to conduction thereby biasing the switching transistor 48 to conduction. When the voltage across the storing capacitor 42 reaches the predetermined switching voltage, which occurs a predetermined time after, the segmented cylinder 30 stops rotating, the Schmitt trigger circuit 46 switches states thereby rendering the switching transistor 48 nonconductive. The delay of the second switching circuit 14, which is determined by the series resistor 44 and the storing capacitor 42, is selected so that there is only a slight delay in reaching the switching voltage after the cylinder 30 stops rotating.

The second switching circuit 12 is employed to activate the reversing solenoid 16. The illustrated circuit is adapted to operate the reversing solenoid in a cassette changer, commonly known as a Staar changer. This reversing solenoid 16 is pulsed, the first pulse causing reversal of its direction of movement of the tape and the second pulse causing ejection of the cassette. The second switching circuit 12 includes a Schmitt trigger circuit 68 connected so that when it switches states, an NPN-switching transistor 70 connected in series with the coil of the reversing solenoid 16 is rendered conductive.

The Schmitt trigger circuit 68 includes a pair of NPN-transistors 72 and 74 having their emitters connected through a common resistor 76 and a diode 78 to ground. The diode 78 keeps the voltage at the emitters at a substantially constant value. The collector of the first transistor 72 is connected to the positive terminal 40 through a collector biasing resistor 80 and is connected to the base of the second transistor 74 through a series resistor 82. The base of the second transistor 74 is connected to ground by a biasing resistor 84. The collector of the second transistor 74 is connected to the positive terminal 40 by a collector biasing resistor 86 and to the base of the switching transistor 70, through a series resistor 88. The base of the switching transistor 70 is connected to ground through a biasing resistor 90. The base of the first transistor 72 of the Schmitt trigger circuit 68 is biased by connecting the same to the junction between a pair of series resistors 38 and 92 between the positive terminal 40 and ground. The emitter of the switching transistor 70 is connected to ground and its collector is connected through a series resistor 94 and the solenoid 16 to the positive terminal 40.

The Schmitt trigger circuit 68 thus switches states when the voltage level across the storing capacitor 36 reaches a predetermined level which occurs a predetermined time after the cylinder 30 stops rotating. This switching of states causes the transistor 70 to be rendered conductive. The Schmitt trigger circuit 68 is returned to its initial state a predetermined time after the switching transistor 70 is rendered conductive by a discharge circuit 96 which is coupled to the delay capacitor 36 and is rendered conductive by the switching transistor 70. The discharge circuit includes a series resistor 98 and a steering diode 100 connected between the collector of the switching transistor 70 and the storing capacitor 36.

The delay in the operation of the second switching circuit 12, which is determined by the series resistor 38 and the storing capacitor 36, is selected so as to be longer than that of the first switching circuit 14. Thus, the second switching circuit 12 switches after the first switching circuit 14 when the cylinder 30 stops rotating. This insures that the reversing solenoid 16 is not activated until the bias oscillator circuit 18 and the audio circuit 20 are deenergized.

In certain situations, it is desirable that the actuation of the reversing solenoid 16 be precluded even though the motion sensing circuit 10 indicates that the reels have stopped. Such situations occur, for example, when the recorder is in its pause mode of operation, when the recorder is energized but is neither in the record or play mode of operation, or when the recorder is in its change or rejection cycle. In the illustrated embodiment, actuation of the solenoid 16 is precluded by a normal open switch 102 connected between the storing capacitor 36 and ground. The switch 102 is suitably actuated by the controls (not shown) of the recorder.

Various changes and modifications may be made in the above-described circuit without deviating from the spirit or scope of the present invention. Various features of the invention are set forth in the accompanying claims.

What is claimed is:

1. A control system for deactivating a recording bias oscillator circuit of a bidirectional recorder prior to activating a reverse solenoid for reversing the motion of tape in said recorder and for switching a recording head, comprising means for sensing the motion of the tape in the recorder and providing a signal when said motion is reduced below a predetermined speed, first switching circuit means responsive to said signal for deactivating the recording bias oscillator circuit, and second switching circuit means responsive to said signal connected for actuating said reverse solenoid, said second switching means including a delay circuit for delaying the operation of said second switching means for a predetermined time after the actuation of said first switching means, whereby the recording bias oscillator circuit is deactivated prior to the switching of said head.

2. A control system in accordance with claim 1 in which the recorder includes an audio circuit and the first switching circuit means deactivates said audio circuit.

3. A control system in accordance with claim 2 in which the recorder is a cassette changer and the second switching circuit means pulses said solenoid in response to said signal.

4. A control system in accordance with claim 1 in which means are provided for supplying a positive voltage, the motion sensing means includes a cylinder rotated by movement of said tape, said cylinder having alternate segments on its surface of conductive and nonconductive material and a conductive circumferential band connecting said conductive segments together, a first sliding contact on said band, and second and third sliding contacts circumferentially disposed on said cylinder so as to be alternately connected by said conductive segments to said first contact, a capacitor connected between ground and said first contact, said third contact being connected to ground, the second switching circuit means includes a resistor and a capacitor connected in series between said positive voltage means and ground, a steering diode having its positive terminal connected to the junction between said resistor and said capacitor and its negative terminal connected to said second contact, a first Schmitt trigger circuit connected to the junction between said resistor and said capacitor so that said trigger circuit switches states when the voltage across said capacitor reaches a predetermined level, a switching transistor having its collector-emitter circuit connected in series with said reversing solenoid and said positive voltage means, the output of said first Schmitt trigger circuit being connected to the base of said switching transistor, the collector of said switching transistor being connected through a steering diode and a resistor to the junction between said resistor and said capacitor, the junction of said resistor and said capacitor being connected to ground through a switch.

5. A control system in accordance with claim 4 in which the first switching circuit means includes a resistor and a capacitor connected between the positive voltage means and ground, the junction between said resistor and said capacitor being connected to said second contact, a second Schmitt trigger circuit connected to the junction between said resistor and said capacitor and being biased so as to switch to its second state when the voltage across said capacitor reaches a predetermined level, and a switching transistor having its collector-emitter circuit connected in series with said audio circuit, said recording bias oscillator circuit and said positive voltage supply, the output of said second Schmitt trigger circuit being connected to said switching transistor so as to render said switching transistor nonconductive when said second Schmitt trigger circuit is in its second state of operation.

* * * * *